April 12, 1960

A. W. VAUGHAN, JR 2,932,825

EGG GRIPPING HOLDER

Filed Sept. 9, 1958

INVENTOR
AUBREY W. VAUGHAN, JR.
BY
Masm, Porter, Diller & Stewart
ATTORNEYS

United States Patent Office 2,932,825
Patented Apr. 12, 1960

2,932,825

EGG GRIPPING HOLDER

Aubrey W. Vaughan, Jr., La Grange, Ill., assignor to Continental Can Company, Inc., New York, N.Y., a corporation of New York Application September 9, 1958, Serial No. 759,981

8 Claims. (Cl. 198—131)

The invention relates generally to egg handling and primarily seeks to provide a novel and efficiently operable device for firmly gripping eggs without danger of breakage thereof.

While adaptable to more general usages the improved device is designed particularly for use in the candling of eggs. It is well known that in this practice the eggs commonly are subjected to visual inspection, while they are held opposite a light source effective to make the eggs more or less translucent. In one known modern method of testing eggs, light rays in the invisible spectrum are employed and the light rays passing through the eggs are received in a light sensitive cell or receiver and are analyzed by a detecting device effective to indicate the quality of the eggs. In such uses, it is important that the light rays pass through the eggs under test, and not around them, on their way to the light sensitive cell, and it is a purpose of the present invention to provide an improved egg holding device which will not only firmly grip each egg under test about the whole ovate perimeter thereof, but also will accomplish that purpose in a manner assuring against breakage of the eggs and any objectionable passage of light rays about exterior portions at the gripped areas of the eggs.

An object of the invention is to provide an egg holder of the character stated comprising an opaque body having at least one egg shaped opening therethrough large enough to receive and pass the largest egg likely to be presented for test, a recess or chamber surrounding and communicating inwardly into the opening, an inwardly expansible egg gripping bellows mounted in the recess or chamber and presenting a gripping wall in the opening, and means for bringing about a pressure differential between the interior and exterior of the bellows effective to cause the gripping wall to firmly grip an egg positioned in the opening.

Another object of the invention is to provide a device of the character stated wherein the bellows is of a type which normally expands into its egg gripping condition and in which provision is made for evacuating the bellows to a non-gripping condition before deposition of an egg in the receiving opening, and for breaking the vacuum after deposition of the egg to cause the gripping wall to grip the egg in the opening.

A further object of the invention is to provide an egg gripping holder of the character stated which may readily be connected in a conveyor chain structure effective to convey the eggs through loading and testing stations and past suitably placed differential pressure control means.

With the above and other objects in view that will hereinafter appear, the nature of the invention will be more clearly understood by reference to the following detailed description, the appended claims and the several views illustrated in the accompanying drawings.

This invention relates broadly to egg holding devices and may be embodied in practical apparatus for use in various processing methods of which candling forms a well known example. In this example disclosure, single units each having a single egg holding opening or pocket are shown, but it is to be understood that the units may be equipped with holding openings or pockets in multiple, and they may be adapted for stationary use, or for use in motion other than the endless chain conveyer mounting suggested herein.

Figure 1:
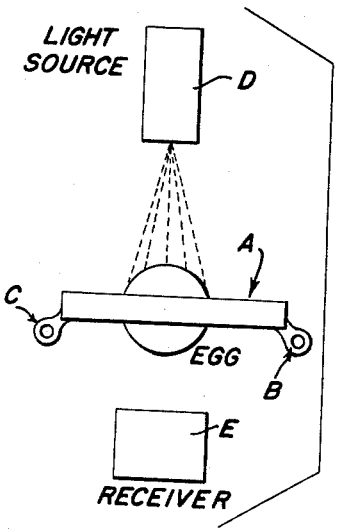
Figure 1 is a diagrammatic view illustrating one use of the invention in which the egg holders are passed between a light ray source and a light ray receiver.

When used in candling processes, the holders generally designated A may be equipped with interfitting lug equipments B and C subject to connection in the formation of a conveyor which may be employed to convey the eggs rapidly past a testing or candling station. An example testing method may employ light rays in the invisible spectrum. The light rays passing through the eggs are received in a light sensitive cell and are analyzed by a device that indicates various qualities of the eggs tested. Such an arrangement is diagrammatically illustrated in Figure 1 wherein the holders A gripping the eggs to be tested are passed between the light source D and the receiver E.

The example holder unit preferably comprises a plastic body 5 formed to include an egg shaped opening therethrough which is larger than the largest egg likely to be received in the opening. The egg receiving opening 6 is surrounded by a chamber generally designated 7 and having upper and lower walls 8 and an outer or surrounding wall 9. It will be apparent by reference to Figures 2 and 3 of the drawing that the chamber opens into the interior of the holder or into the egg receiving opening 6.

Figure 4:
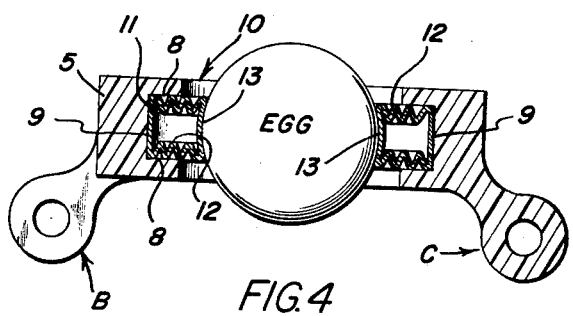
Figure 4 is a vertical cross section taken on the line 4—4 on Figure 3.

An egg gripping bellows generally designated 10 is mounted in the chamber 7 and has an outer wall 11 which is securely bonded to the chamber wall 9. The bellows also includes upper and lower bellows folded walls 12, and an inner or egg gripping wall 13 defining the egg receiving opening. It will be apparent by reference to Figures 2 and 4 of the drawings that the bellows is generally rectangular in radial cross section, the walls thereof being connected in air-tight relation to provide a vacuum chamber within the bellows.

Figure 2:
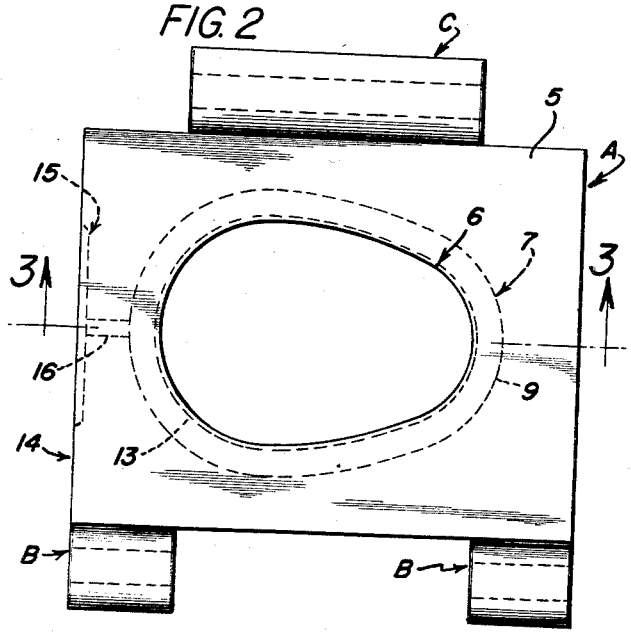
Figure 2 is a plan view illustrating one of the improved egg gripping holders.
Figure 3:
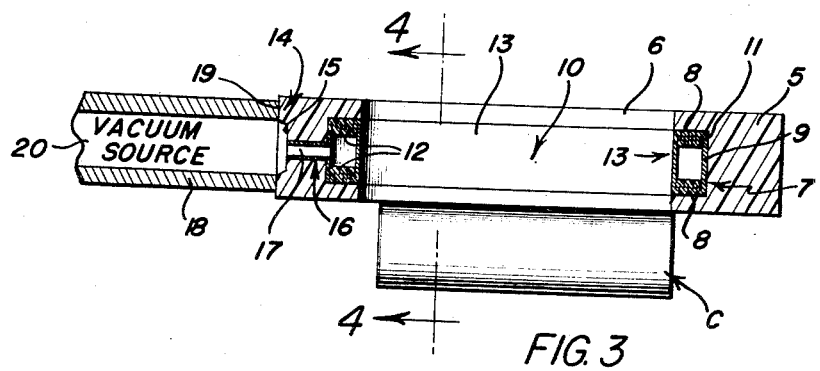
Figure 3 is a vertical longitudinal section taken on the line 3—3 on Figure 2 and showing the holder in cooperative contact with a differential pressure control means.

The holder body 5 includes a flat side wall 14 presented in the direction of travel of the holder when the same is connected in conveyor chain arrangement, and said flat wall is equipped with an elongated slot or groove 15 opening through the face thereof as indicated in Figures 2 and 3. The groove 15 is connected by a duct 16 with the chamber 7, and the bellows has a sleeve extension 17 projected through the duct 16 and opening into the groove 15 as shown in Figure 3. In the said Figure 3 the holder is shown in sliding engagement with a vacuum valve body 18 having a flat face 19 engageable by the wall 14 of the body, said valve body 18 being equipped with a duct 20 connected in any approved manner with a vacuum source (not shown).

It will be apparent that when the lateral face 14 of the holder is brought into flat face sliding engagement with the face 19 of the valve body 18 so as to open communication between the vacuum duct 20 and the interior of the bellows 10 through the bellows sleeve extension 17, as shown in Figure 3, the interior of the bellows will be evacuated and the egg gripping wall 13 will be expanded outwardly. When the egg gripping wall is thus contracted an egg may be deposited into the receiving opening so as to be surrounded by the gripping wall 13 about its long axis. The bellows is so formed as to normally expand its egg gripping wall 13 inwardly in the manner illustrated in Figure 4, thereby to firmly grip an egg without danger of breaking the same. Thus the evacuation of the bellows as illustrated in Figure 3 takes place each time it is intended to deposit an egg in the holder for the purpose of testing, or to discharge or drop a tested egg from the holder. Therefore, vacuum valve communications will be provided at each egg receiving and each egg discharging position, and at positions intermediate these egg receiving and discharging positions there will be no vacuum communication and the eggs will be gripped in the manner illustrated in Figure 4.

While a preferred example disclosure is made herein, it is to be understood that variations in the structure and arrangement of parts may be made without departing from the spirit of the invention as defined in the appended claims.

I claim:

1. An egg holder comprising an opaque body having an egg shaped opening therethrough large enough to receive and pass the largest egg likely to be presented to the holder for being held in said opening, a chamber surrounding and communicating inwardly into said opening, an inwardly expansible egg gripping bellows mounted in the chamber and presenting an egg gripping wall in the opening, and means for bringing about a pressure differential between the interior and exterior of the bellows effective to cause the gripping wall to release an egg positioned in the opening.

2. An egg holder comprising an opaque body having an egg shaped opening therethrough large enough to receive and pass the largest egg likely to be presented to the holder for being held in said opening, a chamber surrounding and communicating inwardly into said opening, a bellows mounted in the chamber and presenting an egg gripping wall in the opening and having provision for constantly tending to expand said wall in the opening to grip an egg presented therein, and means for bringing about an evacuation of the bellows prior to deposition of an egg in said opening to cause outward expansion of said gripping wall and permit deposition of the egg so that upon release of said vacuum the bellows will expand and cause said gripping wall to firmly grip the egg deposited in said opening.

3. An egg holder as defined in claim 2 wherein the bellows has a generally rectangular radial cross section presenting, in addition to the egg gripping wall, an outer wall paralleling said gripping wall and which is bonded in fixed position in the chamber, and upper and lower walls which have folds therein permitting inward and outward movement of the gripping wall under the influence of changes of pressure application on said gripping wall.

4. An egg holder as defined in claim 2 wherein the bellows has a generally rectangular radial cross section presenting, in addition to the egg gripping wall, an outer wall paralleling said gripping wall and which is bonded in fixed position in the chamber, and upper and lower walls which have folds therein permitting inward and outward movement of the gripping wall under the influence of changes of pressure application on said gripping wall, said body including a laterally presented flat face having a longitudinal groove therein, and said bellows including a vacuumizing duct extension opening into said groove and communicating with the interior of the bellows.

5. An egg holder as defined in claim 1 wherein the body includes sides and ends and wherein means are provided on said ends for connecting like holders together in a conveyor structure through which movement may be imparted to the holder units.

6. An egg holder as defined in claim 1 wherein the body includes sides and ends and wherein means are provided on said ends for connecting like holders together in a conveyor structure through which movement may be imparted to the holder units, and wherein the pressure differential controlling means includes a stationary pressure modifying duct and each holder includes a duct opening through one of its sides in position for communicating with said pressure modifying duct as the holder is moved therepast.

7. An egg holder as defined in claim 2 wherein the bellows has a generally rectangular radial cross section presenting, in addition to the egg gripping wall, an outer wall paralleling said gripping wall and which is bonded in fixed position in the chamber, and upper and lower walls which have folds therein permitting inward and outward movement of the gripping wall under the influence of changes of pressure application on said gripping wall, said body including sides and ends and means on said ends for connecting like holders together in a conveyor structure through which movement may be imparted to the holder units, one side on each holder having a flat face wherein a longitudinal groove is formed, and each bellow including a vacuumizing duct extension opening into the groove of the respective holder side face and communicating with the interior of the bellows, and there also being included a means presenting a flat face for contact with each holder flat face moved therepast and having a vacuumizing duct opening therethrough for communication with each passing holder flat face groove.

8. An egg holder comprising a body having an egg receiving opening, an egg gripping bellows supported by said body in alignment with the opening to grip an egg resiliently projecting into the opening, said bellows having inwardly disposed egg gripping wall, and means for bringing about an evacuation of said bellows to cause outward expansion of said egg gripping wall and permit disposition of the egg within the bellows so that upon release of the vacuum said bellows will expand and cause said egg gripping wall to firmly grip the egg deposited in the opening.

References Cited in the file of this patent

UNITED STATES PATENTS

| 877,490 | Davis | Jan. 28, 1908 |
| 2,443,987 | Morrison et al. | June 22, 1948 |
| 2,756,883 | Schreck | July 31, 1956 |